Feb. 10, 1953   T. W. STRINGFIELD ET AL   2,628,267
ELECTRIC LINE FAULT LOCATORS

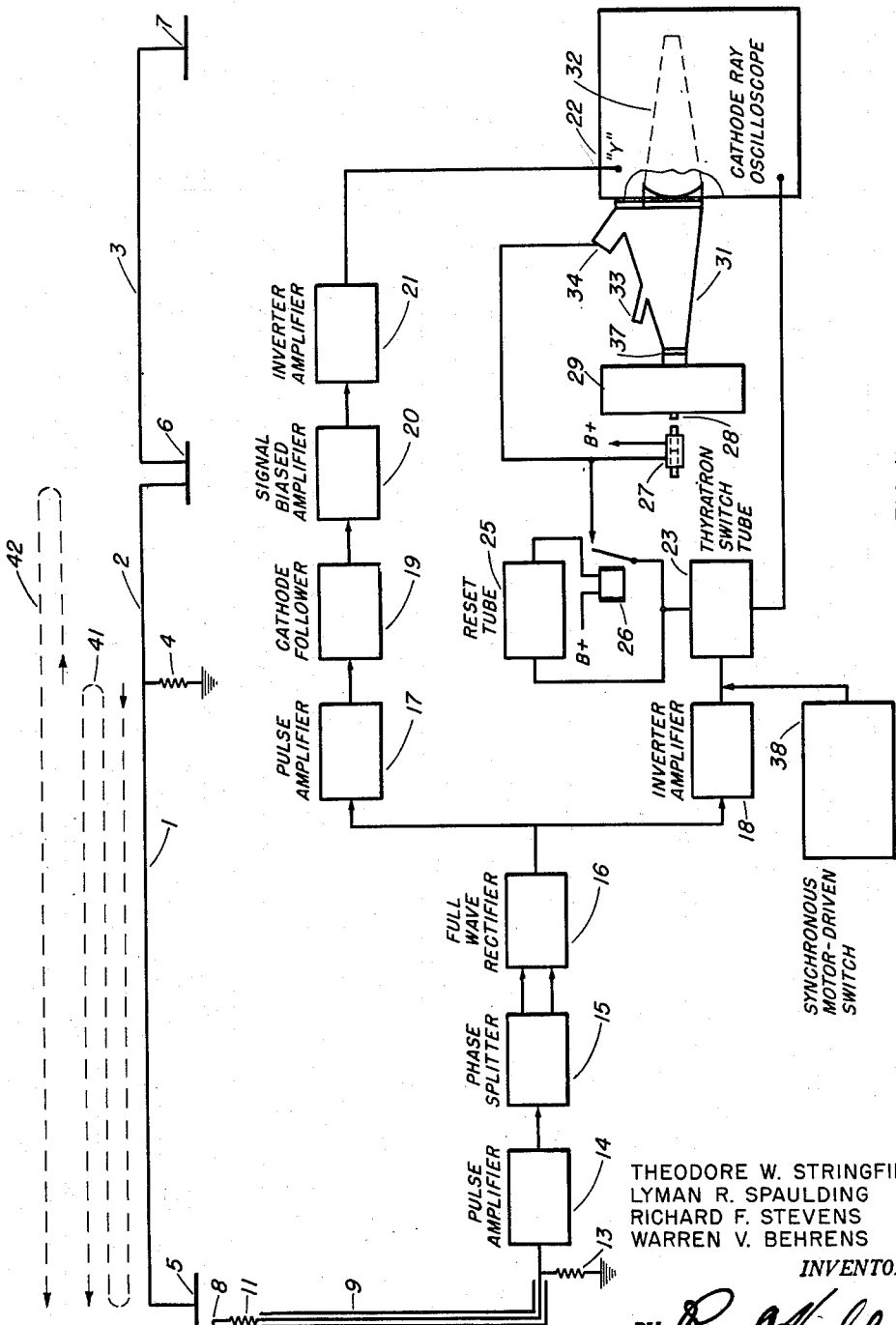

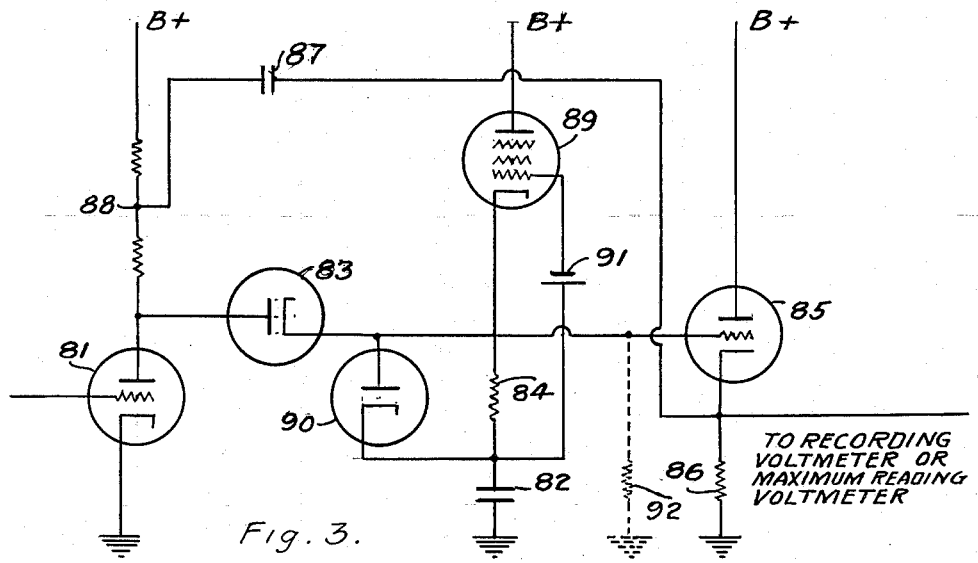
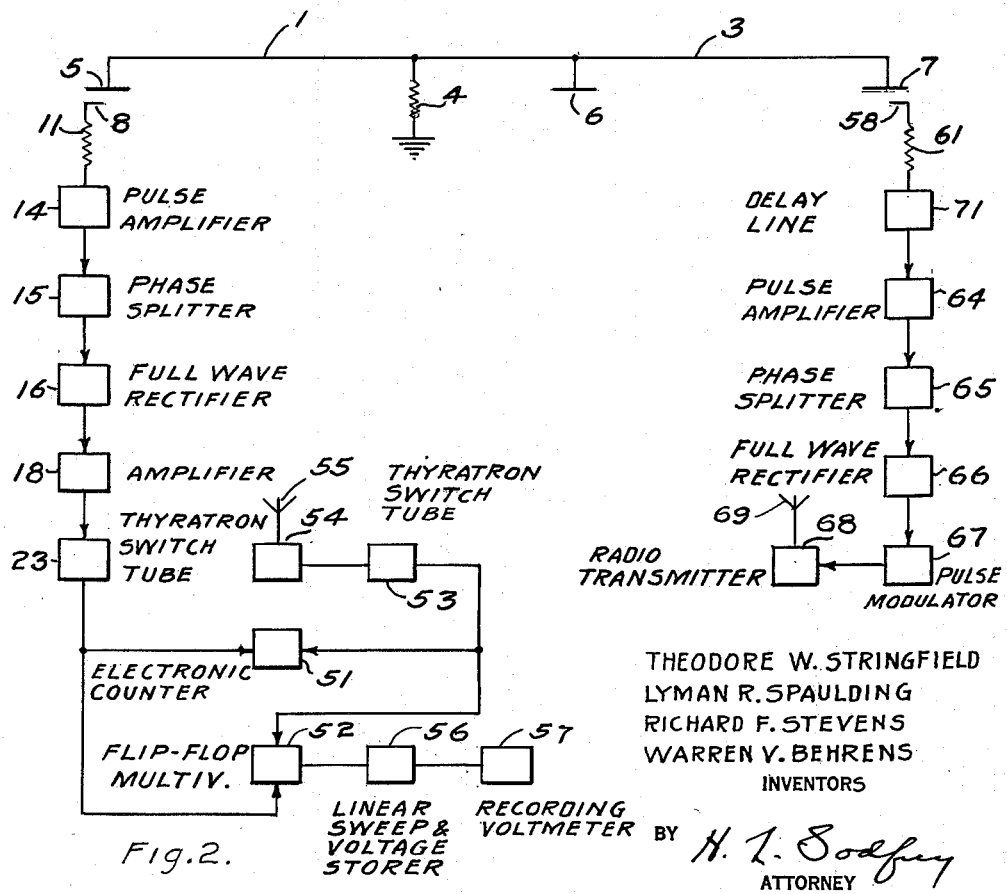

Filed March 31, 1949                3 Sheets-Sheet 3

THEODORE W. STRINGFIELD
LYMAN R. SPAULDING
RICHARD F. STEVENS
WARREN V. BEHRENS
    *INVENTORS*

BY

Patented Feb. 10, 1953 2,628,267

UNITED STATES PATENT OFFICE 2,628,267

ELECTRIC LINE FAULT LOCATORS

Theodore W. Stringfield, Portland, Richard F. Stevens, Oswego, Lyman R. Spaulding, Portland, and Warren V. Behrens, Rainier, Oreg., assignors to the United States of America as represented by the Secretary of the Interior Application March 31, 1949, Serial No. 84,666

5 Claims. (Cl. 175—183)

(Granted under Title 35, U. S. Code (1952), sec. 266)

The invention described herein may be manufactured and used by or for the Government of the United States for governmental purposes without the payment to us of any royalty thereon in accordance with the provisions of the Act of April 30, 1928 (Ch. 460, 45 Stat. L. 467).

This invention relates to the operation of electric power transmission lines. In the practical operation of transmission lines, faults occur occasionally as the result of broken insulators, flash-overs due to lightning strokes or other causes. Faults are characterized by failure of insulation or dielectric between a line conductor and the ground or between two or more line conductors.

Many faults involve only a temporary breakdown of the dielectric insulation between conductors and ground (flashover and arc) and cease to exist after the line is de-energized, allowing the line to be re-energized immediately. However, in many cases the insulation is left in a damaged condition necessitating repair to prevent successive failures. The damage may also be such as to decrease the flashover value of the insulation below normal line voltage preventing re-energization but such as to retain so high a resistance that the line appears unfaulted to lower voltages which might be used for test. Exceptionally severe faults may cause complete destruction of the insulation, possibly dropping the conductor, and the D. C. resistance of the fault may be of almost any value depending upon the extent of the damage.

This invention has as its principal object the location of transmission line faults at the time the fault occurs by remote observation of the transmitted effects or evidences of the fault. Another object is to make a record of the occurrence of the fault from which the location can be determined at any subsequent time. Still another object is to provide a visual indication of the fault location immediately after its occurrence. Another object is to provide arrangements for making the fault location record photographically with a minimum of manual operations. Other objects include the transmission of the fault-locating signals by automatically operated equipment, the use of very fast methods of transmission of the fault signals, and the provision of alternative methods of transmission and record. What constitutes this invention is described in the specification and drawings following and succinctly defined in the appended claims.

The specification has reference to the drawings in which the respective numerals indicate equivalent entities in the several drawings wherein:

Figure 1 is a schematic diagram of this invention in a preferred form utilizing direct transmission line propagation of fault signal transmission.

Figure 2 is a similar diagram showing the invention for use with radio transmission of fault signals.

Figure 3 is a circuit diagram of a novel linear sweep and voltage storer which is a component of the system shown in Figure 2.

Figure 4:
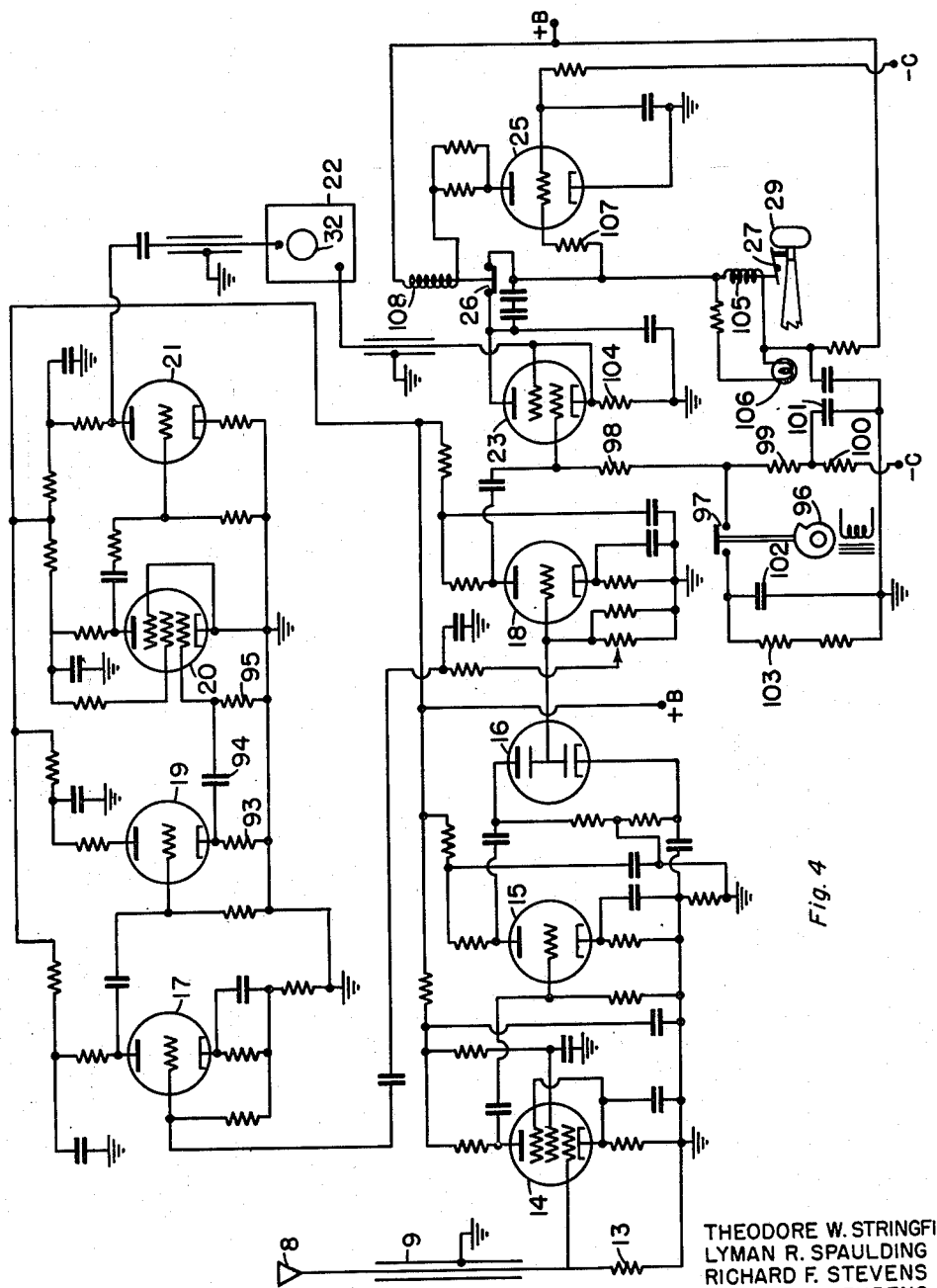
Figure 4 is a circuit diagram showing in some detail the principal components of the system embodied in Figure 1.

In Figure 1 there is shown in one-line convention a power transmission line and a preferred embodiment of our invention. Several of the individual components of the system are indicated by labeled blocks. In each instance the labeled block within itself can be derived from conventional apparatus. It is the novel combination and use of these conventional components that is involved in this embodiment.

The transmission line in Figure 1, composed of two sections subdivided for purposes of explanation into partial lengths 1, 2, and 3, is subjected to a fault arcover 4. Ordinarily the line would be polyphase but throughout Figure 1, the one-line convention is used for convenience. Associated with the transmission line there are, for this illustration, three substation busses 5, 6, and 7.

A capacitive or other suitable coupling 8 is placed in operative relationship with bus 5 so that any change in voltage occurring between line and ground on bus 5 impresses a corresponding difference of potential on coupling 8. Coupling 8 is connected to a signal line 9, such as a coaxial cable through a resistor 11. The combination of the coupling 8, signal line 9 and resistor 11 acts as a so-called differentiating circuit or high-pass filter, passing only the steeply fronted component of a traveling wave, and delivering under suitable conditions sharp pulses of short duration through signal line 9.

Signal line 9 is connected to a second resistor 13 which terminates the line in its characteristic or surge impedance. That is, the value in ohms of resistor 13 is numerically equivalent to the surge impedance of line 9. The output of signal line 9 is impressed upon a pulse amplifier 14. Pulse amplifier 14 delivers an amplified pulse signal to a phase splitter 15.

The phase splitter 15 is capable of receiving pulses representing potential differences which are either positive or negative with respect to ground and delivering therefrom two pulses, one of which is positive and the other negative with respect to ground. These positive and negative pulses are delivered by phase splitter 15 to a full wave rectifier 16 which rectifies the received pulses delivering a single pulse polarized in a selected direction. Thus, regardless of the polarity of the pulse of potential difference received at coupling 5, the polarity of the pulse delivered by rectifier 16 is always the same.

The pulse output of rectifier 16 is delivered into two separate paths, one of which, beginning with a pulse amplifier 17, operates as a signal amplitude transmission path; and the other, beginning with an inverter amplifier 18, operates as a timing or triggering channel.

Pulse amplifier 17 transmits a signal to a cathode follower 19 which overdrives a remote cut-off type vacuum tube in a signal biased amplifier 20 in which a grid leak bias is set in accordance with the magnitude of the first pulse received in a sequence of operations. The gain of amplifier 20 is, by this process, set to values inversely proportional to the pulse magnitude. The gain, once set, remains approximately constant for a length of time sufficient for completing the operation of the system. The output of signal-biased amplifier 20 is delivered to an inverter amplifier 21 where the signal is further amplified and inverted. The inverted signal is delivered to the vertical (Y) axis amplifier of a cathode-ray oscilloscope 22 which provides the necessary difference of potential for the vertical deflection of the oscilloscope trace.

In the second signal path, beginning with inverter amplifier 18, the amplified and inverted signal is delivered to a thyratron switch 23 which is ionized into conductivity by the received signal. A voltage produced in the cathode circuit of tube 23 is used to trigger the sweep control circuit of the oscilloscope 22. The oscilloscope is arranged to sweep the cathode ray or trace once across the horizontal (X) axis of the oscilloscope for each triggering impulse. After each operation, tube 23 is extinguished and reset by a reset tube 25 which operates relay 26, momentarily interrupting the plate current to tube 23.

Switch tube 23 when ignited causes a current to flow in the coil of a solenoid 27, the armature of which strikes a button 28 on a camera 29 causing a new frame to rack up after the phenomena traced in oscilloscope 22 has been photographically recorded. Camera 29 is a conventional moving picture camera mechanically arranged with a light shield 31 to photograph the cathode ray trace appearing in the oscilloscope tube 32 of oscilloscope 22. Light shield 31 is provided with a peep opening 33 to permit adjustment of the system by the operator.

An arrangement for recording the time of each photograph is provided in an extension 34 of the light shield 31 in which an argon lamp is placed. A clock or watch of conventional form is illuminated each time a current impulse is produced by switch tube 23. The momentary illumination of the clock impresses the clock image on the film frame then in exposure in camera 29 providing a record of the time of the operation of tube 23.

The successive frames of film in camera 29 are in exposure for varying lengths of time. If no fault occurred, the film frame would remain indefinitely. There is a small amount of light from the glow of the cathode in the cathode ray tube 32 which gradually fogs the exposed film frame. This effect may be decreased by interposing a light filter 37 between the camera 29 and light shield 31. The film frame is advanced periodically by a synchronously driven triggering contactor 38. Ordinarily the film is advanced once each hour.

The structure described above is composed of components which individually can be found in the literature of the related arts, particularly radar. The modifications required in existing devices to adapt them to use in our invention are of a type that could ordinarily be accomplished by one sufficiently skilled in the related arts.

For explaining the overall operation of this invention for the location of transmission line faults, let it be assumed that a fault such as a flashover from line to ground occurs at 4 as indicated. When this flashover occurs, a surge of voltage and current is propagated along the transmission line portions 1 and 2 in both directions from the fault. The propagation of the surge from the fault 4 to the bus 5 follows a course indicated by the dotted line 41. The surge from fault 4 to bus 6 follows a course 42.

The arrival of the surge at bus 5 results in impressing a difference of potential on collector 8 which is transmitted and amplified through line 9, etc. to the oscilloscope 22, triggering the X-axis oscilloscope sweep. This surge is then partially reflected from bus 5 back toward fault 4 where it is again reflected back to bus 5 where it arrives for the second time. The difference in time between these two successive arrivals is proportional to twice the distance between bus 5 and fault 4.

The surge from fault 4 to bus 6 is reflected at bus 6 back to bus 5, arriving at bus 5 after the surge that traveled directly from 4 to 5. The difference in time between the arrival of the surge reflected from bus 6 and the surge arriving at bus 5 directly from fault 4 is proportional to the difference between the distance from 4 to 6 and back to 5, and the distance from 4 to 5, this difference being equal to twice the distance between 4 and 6. The time taken by the cathode ray tube 32 sweep along the X-axis is adjusted to be more than the maximum possible difference in time between the arrival of the surge directly from 4 to 5 and the arrival of the surge by reflection from bus 6. This length of time is approximately twice the length of the line section bus 5 to bus 6 divided by the speed of surge propagation along the line which speed is only a little less than the speed of light.

The duration of time to which the X-axis sweep is adjusted is preferably limited to the time required for the surge to travel twice the length of the line section bus 5 to bus 6, in order to obtain the maximum expansion of scale in the sweep length available on the face of the oscilloscope tube. If additional lines of shorter length than 5 to 6 also terminate at bus 5, then reflection from the far terminals of these lines will also appear in the record and are identified by knowledge of the lengths of the corresponding lines.

The record of the surges is made in the form of brief deflection of the cathode ray tube beam in the Y-axis direction along the X-axis. These deflections are commonly referred to as "pips" as in radar technique. In oscilloscope 22, a conventional timing circuit provides calibrated marker pulses which are also fed to the Y-axis deflection plates in tube 32 with such polarity as to produce small downward pips at intervals corresponding to selected distances such as 10 miles of transmission line. The circuit through rectifier 16 is connected so that the fault surge pips produce upward deflection. The record is interpreted by observing the distance between the trace origin and the surge pips in miles of line.

Ordinarily the record will show two pips which are desired for interpretation. One pip will be that recorded when the fault surge has arrived at bus 5 after having traveled from fault 4 over the first third of path 41 to bus 5, then having been reflected at bus 5, traveling back to fault 4 over the second third of path 41 and there being reflected again, and finally traveling a second time over the third of path 41 to bus 5 at which time the arrival would be recorded. It has already been explained that the first arrival of the fault surge at bus 5 from fault 4 was used to trigger the sweep operation of the recording equipment. The second desired pip will be that recorded after the fault surge has traveled from fault 4 to bus 6 over the first part of path 42 where reflection would occur, and back over the remainder of path 42 through fault 4 to bus 5.

Ambiguity exists in the identities of pips resulting from the surges received over the respective paths 41 and 42. The fault location, however, is known immediately to be in one of either of two places equally distance from bus 5 and bus 6 respectively. That is, for example, a fault 10 miles from bus 5 will under some circumstances make a record which by simple measurement only would not be distinguished from a fault 10 miles from bus 6. This ambiguity is, in effect, eliminated inasmuch as the pips are of varying shapes. The pips produced by reflection at the busses where the coefficients of reflection of the surges are more favorable are sharper and of greater magnitude than pips produced by less favorable reflection at the fault. Thus an operator is able to interpret the record correctly.

The necessity of using an oscilloscope and photographic recording have been avoided in a second preferred form of embodiment of our invention as shown in Figure 2. In Figure 2, those components of the system bearing numerals the same as in Figure 1, operate as already described. Omitting other parts of Figure 1, Figure 2 includes means for transmitting a surge signal from the end bus 7 of the line to bus 5 by a radio channel which in a preferred form approximately parallels the line and utilizes either short wave radio or carrier current transmission.

Specifically in Figure 2, elements 8 to 16 inclusive operate with amplifier 18, and switch tube 23 to provide a triggering signal to initiate action in a time recording system which receives, in effect, a single impulse from bus 5 and one from bus 7. For this purpose, the output signal of switch tube 23 is delivered to an electronic counter 51 of ordinary commercial form and a flip-flop multivibrator 52. Electronic counter 51 and multivibrator 52 receive also impulses from a second switch tube 53 which is actuated by the detected signal from a receiver 54. Receiver 54 is conventional, receiving a radio signal through an antenna 55. Flip-flop multivibrator 52 starts a linear sweep and voltage storer 56 (explained in detail in reference to Figure 3) which delivers a voltage to a recording or maximum reading voltmeter 57. Multivibrator 52 starts voltage storer 56 on the first impulse of a cycle and stops storer 56 on the succeeding impulse. Voltage storer 56 produces and stores a voltage proportional to the time between the initiating and stopping impulses.

The surge signal that stops electronic counter 51 and voltage storer 56 arrives from the distant end of the transmission line. At bus 7 a coupling 59, resistor 61, pulse amplifier 64, phase splitter 65, and full wave rectifier 66 perform functions exactly similar to those of elements 8 to 16 inclusive at bus 5. Full wave rectifier 66 delivers a pulse always of the same polarity to a pulse modulator 67 which modulates a radio transmitter 68 sending out signals on antenna 69. The transmitted radio signals from antenna 69 are received in the conventional way by antenna 55.

In the system of Figure 2, a fault 4 produces a surge that reaches bus 5 in time equal to the distance fault 4 to bus 5 divided by a velocity a little less than the speed of light. A surge originating at fault 4 travels also in the line toward bus 7 where a signal is sent by radio to antenna 55 which is near bus 5, so that the bus 7 pulse arrives in effect at bus 5 in time equal to the distance fault 4 to bus 7 divided by a velocity a little less than the speed of light plus the distance from bus 7 to bus 5 divided by the speed of light. A fault 4 occurring at bus 7 would be signaled at bus 5 by radio almost simultaneously but slightly ahead of the pulse received at bus 5 from the transmission line, depending on the actual transmission line distance as compared to air line distance, so the operation would be defective. This is avoided by introducing a conventional signal delay line 71 into the circuit and shown for convenience between resistor 61 and amplifier 64 so that any fault, wherever it occurs on the line sections 1 and 3, will arrive at bus 5 over the line before it can arrive at bus 5 by radio. The required time of delay is determined and adjusted for the particular installation.

In interpreting the records of faults in the electronic counter 51 and the recording voltmeter 57, the recorded time is the difference between the time of arrival of the fault pulse by way of bus 5 and the time of arrival of the fault pulse by way of bus 7. The time difference is related to line length and fault location by calibration providing analytic, graphical, or tabular relationships as may be desired for rapid conversion to distance upon occurrence of a fault. The scales of the electronic counter 51 and recording voltmeter 57 can be calibrated to read direct in miles distance of the fault from a specified location on the line section 1 and 3, as from bus 5.

In Figure 2 all the labeled blocks represent instrumentalities which can be of conventional form or of a form that could be derived from conventional forms by modifications that could ordinarily be expected to be accomplished through design by one thoroughly skilled in the related arts. An exception is the linear sweep and voltage storer 56. This is explained further in reference to Figure 3.

In Figure 3, a triode vacuum tube 81 receives the flip-flop signal from the flip-flop multivibrator 52 applied to the control grid of tube 81. Tube 81 normally is in a condition of zero bias so the plate is virtually at ground potential. When the first signal to the flip-flop is received, bias voltage is developed on the control grid of tube 81 so a voltage is built up between the plate and cathode thereof. This voltage is applied to a condenser 82 through a diode 83. Condenser 82 receives a change at a rate proportional to the quotient of voltage of tube 81 minus the condenser voltage divided by the resultant resistance of a resistor 84 in the circuit of condenser 82 and other circuit elements associated therewith. This proportionality of rate of charging departs from linearity if no compensation is applied.

Compensation to produce linearity is accomplished by using a second triode 85 with a cathode resistor 86 and a connection to the plate circuit of tube 81 through a condenser 87. A tapped resistor 88 is inserted in the plate lead of tube 81 for providing the appropriate division of voltage for condenser 87. This system of producing linearity in condenser charging rate is known in the related arts. Resistor 88 and condenser 82 are temperature compensated.

When the second signal is delivered to flip-flop multivibrator 52, it returns to its initial state, tube 81 again becomes conducting and the plate of 81 returns to nearly ground potential. The stored charge on condenser 82 is proportional to the time between arrival of the two signals and this stored charge is trapped by diodes 83, 90 and tube 89 in conjunction with resister 84.

In the use of the circuit of Figure 3 in Figure 2 it is desirable that the rate of discharge of condenser 82 through leakage paths be decreased in order to give more time for recording the condenser voltage at substantially the voltage to which the condenser had been charged following the occurrence of a fault. The delay in discharge is accomplished by an amplifying tube 89 and a diode 90, connected as shown to resistor 84. When condenser 82 is being charged by the action of tube 81 the cathode of diode 83 is positive with respect to ground, making the upper end of resistor 84 positive with respect to its lower end and the upper terminal of condenser 82 positive with respect to ground. Diode 90 in parallel with resistor 84 permits current to flow in charging condenser 82 without being opposed by a severe voltage drop through resistor 84.

In discharging condenser 82, diode 90 is nonconducting so that the discharge current from condenser 82 makes the lower end of resistor 84 positive with respect to the upper end. Amplifier tube 89 is biased by a biasing battery 91 to zero plate current when condenser 82 is not discharging. When condenser 82 is discharging the development of a difference of potential at the lower end of resistor 84, in respect to the upper end, makes the control grid of amplifier tube 89 sufficiently positive in respect to the cathode thereof to permit the flow of plate current. Plate current flow in tube 89 increases the potential of resistor 84 relative to ground and so retards the escape of current. Expressed in another way, it may be said that tube 89 provides a current to ground in the leakage path followed by the current being discharged from condenser 82. The leakage path is represented in Figure 3 by a resistor 92, shown as a broken line, across which, in effect, the plate current of tube 89 develops a voltage which would be the same as that which would be flowing if the voltage on condenser 82 were much higher than it actually is. This opposes the flow of current from condenser 82 and, in consequence, delays the discharge thereof.

Reset switches, either ganged or independent, for the thyratron tubes 23 and 53, electronic counter and the voltage storer may be provided for either automatic or manual operation. These reset switches may be interlinked with the circuit breakers in the substation to either cause or prevent reset as may be desired.

Although the descriptions given above would, in general, enable those skilled in this art to construct practical embodiments of our invention, a preferred form is illustrated in some detail in Figure 4. Figure 4 corresponds to the schematic diagram in Figure 1. The various resistors and condensers and other conventional details shown in Figure 4 are not described individually insofar as they can be readily understood by reference to prior art. Amplifier 14, for example, is known in the art as a pulse amplifier or video amplifier. Amplifier 15, referred to as a phase splitter, is similar in principle to amplifiers known as phase inverters or phase splitters used in audio amplification circuits. Full wave rectifier 16 is analagous to a detector in an ordinary radio circuit, in this invention delivering pulses all of one polarity from an input of alternating polarity. Pulse amplifier 17 is similar in principle to pulse amplifier 14 and of similarly conventional design. Inverter amplifier 18 is a video-type amplifier that delivers pulses of a single polarity to control thyratron switch tube 23. Cathode follower 19 is a conventional circuit in which, however, the cathode-grid circuit resistance is only of the order of 1000 ohms. Inverter amplifier 21 is a simple low-gain video amplifier.

Signal-biased amplifier 20 is analogous in some respects to a volume control in a conventional radio receiver. In this invention, however, the signal bias is applied very rapidly and is retained only for a short time. The gain in amplifier 20 is set inversely in proportion to the size of the signal delivered by cathode follower 19. The pulse signal delivered by cathode follower 19 produces a voltage of brief duration across a resistor 93. This voltage is impressed on a cathode-grid coupling condenser 94, with a voltage consequently impressed on grid resistor 95. The voltage of resistor 95 is negative with respect to ground and accordingly tends to decrease gain in amplifier 20.

In order to be effective in this invention the time constant of the circuit containing cathode resistor 93 and condenser 94 must be very short. This is accomplished by making resistor 93 low, of the order of 1000 ohms and condenser 94 relatively small, of the order of 0.01 microfarad. Condenser 94 discharges through the circuit comprising resistors 93 and 95. By making resistor 95 large, of the order of a megohm, condenser 94 discharges relatively slowly, taking time of the order of 0.01 second. This length of time is several times the duration of the cathode ray recording sweep. The essential requirement is that condenser 94 charges very quickly and discharges comparatively slowly.

The synchronous motor-driven switch 38 includes the components numbered from 96 to 103 inclusive shown in Figure 4. An electric clock motor and cam 96 operate a switch 97 periodically. Thyratron switch tube 23 receives grid bias potential from —C through grid resistors 98 and 99 and a stabilizing resistor 99. The normal bias voltage is maintained on a condenser 101. Switch 97 is normally open but closes briefly at predetermined intervals. When switch 97 closes, the difference of potential existing across a condenser 102 is impressed on the grid of tube 23 through resistor 98. Prior to closing switch 97, condenser 102 has been uncharged, having been discharged through a resistor 103. Thus when switch 97 closes, resistor 98 is brought momentarily to ground potential causing tube 23 to become conducting. The potential of resistor 98 charges rapidly by condenser 102 being charged through resistors 99 and 100 to −C potential.

When tube 23 becomes conducting, a pulse of voltage is produced across a cathode resistor 104 which is impressed on oscilloscope 22. Tube 23 receives plate current from +B through coil 105 of relay 27. The surge of plate current in coil 105 operates relay 27 when tube 23 becomes conducting, operating camera 29, racking up one frame of film. The momentary surge of current through coil 105 is impressed on a neon or argon lamp 106 which is situated in the extension 34 of photographic shield 31.

The same voltage developed across coil 105 is impressed on the grid of reset tube 25 through grid resistor 107 causing tube 25 to draw a surge of plate current through coil 108 of relay 26. This opens the contacts of relay 26 interrupting the plate current of thyratron 23. By the time relay 26 opens, condenser 102 will have become charged so that the potential on the grid of tube 23 will have been restored to the normal negative cutoff bias. When relay 26 closes, tube 23 will be non-conducting and the system will be ready for another operation.

Having described our invention, we claim:

1. In the detection and location of power transmission line faults, the method which consists of detecting the arrival at one end of said line of a current surge originating at said fault, initiating immediately at said end of the line time recording action, detecting the second arrival at said end of line of this surge after being reflected from said end of line and then from the fault, detecting the arrival of another current surge originating at said fault but having first traveled along the line in the direction opposite that of said first surge, recording the elapsed time between the respective arrivals of said surges, and computing from said elapsed times the distance of said fault from the ends of said line.

2. In combination, a transmission line, an indicating means coupled to said line at one point only, a time base circuit connected to said indicating means, said time base circuit being coupled to said line at said one point and arranged to be energized by the arrival of a surge pulse at said point to provide a single operation of said time base cycle, recording means associated with said indicating means and arranged to record the time between the arrival of said point of a surge pulse caused by a fault and reflections thereof.

3. The combination of claim 2 in which said indicating means is coupled to said line through an amplifier, a phase splitter, and a full wave rectifier to convert all received pulses to pulses of one predetermined polarity.

4. In combination, a transmission line, a cathode ray oscilloscope having deflecting means for deflecting the cathode ray in two angularly related directions, one of said deflection means being coupled to said line at one point only thereof, a time base circuit connected to the other of said deflecting means, said time base circuit being coupled to said line at said one point arranged to be energized in response to the arrival of a surge pulse at said point to provide a single time base, and recording means associated with said oscilloscope and arranged to record the time between the arrival at said point of a surge pulse caused by a fault and reflections thereof.

5. The combination of claim 4 in which the oscilloscope is coupled to said line through an amplifier, a phase splitter, and a full wave rectifier to convert all received pulses to pulses of one predetermined polarity.

THEODORE W. STRINGFIELD.
RICHARD F. STEVENS.
LYMAN R. SPAULDING.
WARREN V. BEHRENS.

REFERENCES CITED

The following references are of record in the file of this patent:

UNITED STATES PATENTS

| Number | Name | Date |
|---|---|---|
| 2,146,769 | Schriever et al. | Feb. 14, 1939 |
| 2,253,975 | Guanella | Aug. 26, 1941 |
| 2,315,450 | Nyquist | Mar. 30, 1943 |
| 2,345,932 | Gould | Apr. 4, 1944 |
| 2,473,208 | Larsen | June 14, 1949 |
| 2,493,800 | Biskeborn | Jan. 10, 1950 |

OTHER REFERENCES

A. I. E. E. Technical paper 47-86 entitled "Pulse Echo Measurements on Telephone and Television Facilities" by Abraham et al. December 1946; pages 12, 13 and 14.